United States Patent Office 3,558,736
Patented Jan. 26, 1971

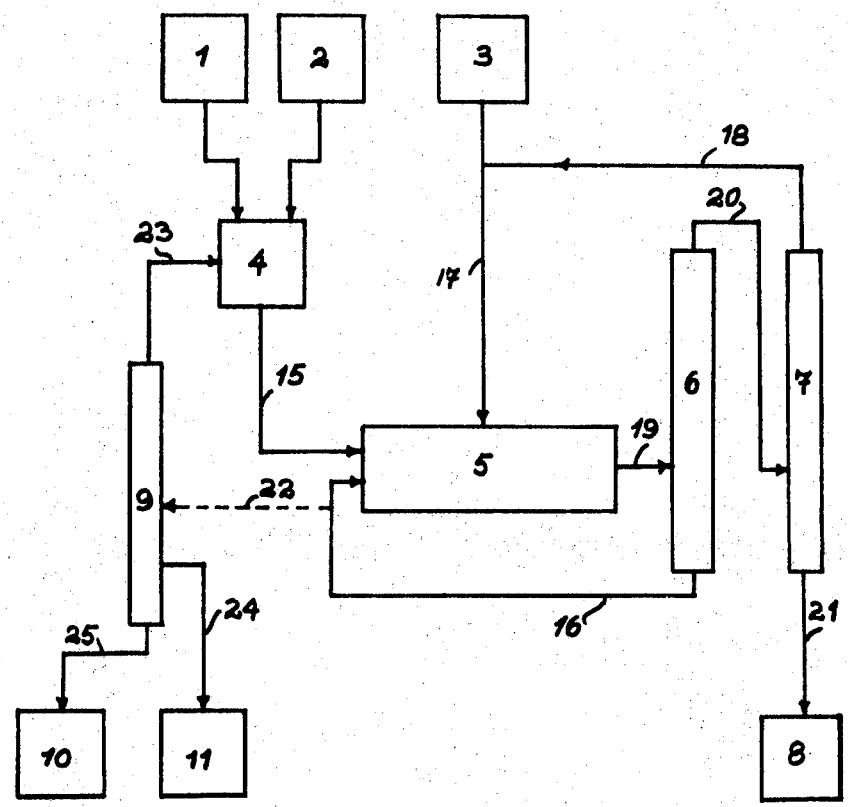

3,558,736
PROCESS FOR THE PRODUCTION OF 3-METHYL PENTENES FROM ETHENE
Normann Bergem, Oslo, Ulf Blindheim, Skedsmokorset, Olav-Torgeir Onsager, Bekkestua, and Hagbarth Wang, Oslo, Norway, assignors to Sentralinstitutt for Industriell forskning, Oslo, Norway
Filed Aug. 16, 1967, Ser. No. 661,004
Claims priority, application Norway, Aug. 26, 1966, 164,462
Int. Cl. C07c 3/10
U.S. Cl. 260—683.15                                   1 Claim

ABSTRACT OF THE DISCLOSURE

Ethylene is converted to 3-methylpentene using a catalyst system comprising a compound of a metal from Group 8 of the periodic table, a Lewis acid compound of a metal from Group 2 and/or 3 of the periodic table, and a Lewis base compound of the elements of Group 5 and/or 6 of the periodic table. The reaction product consists essentially of normal butene and 3-methylpentene, the 3-methylpentene is recovered, and all or a part of the normal butene is recycled to the reaction zone.

---

The present invention relates to the production of 3-methylpentenes from ethene.

Lately a number of processes for oligomerization of ethene have been developed. These processes, however, do either give dimerized products, normal butenes, or they give a reaction product which mainly contains a mixture of higher olefines with a high content of normal (straight-chained) olefines.

From U.S. Pat. No. 3,087,978 it is known to prepare 3-methylpentenes by reaction of ethene and butene-1 or butene-2 by using alkali metal catalysts. Due to the relatively low catalytic activity it is necessary to use pressures from at least 13 atmospheres and up to 130 atmospheres and a reaction temperature of from about 100° C. to 325° C.

The preparation of 3-methylpentenes is also known from Belgian Pat. No. 651,596 employing catalysts based on π-allyl-nickel compounds. In the catalyst systems described in said patent use is made of components which are unstable and difficult to obtain; the synthesis and use of said catalyst systems are therefore connected to great operational difficulties.

The catalytic activity of these systems are stated to be caused by presence of the unstable and easily decomposeable π-allyl-nickel bonds.

Due to the development of increasingly larger cracking units for higher hydrocarbons, ethene has become a cheap and easily available raw material for chemical industries.

We have now found an improved method for the production of 3-methylpentenes from ethene by use of a stable and selective catalyst system and a convenient sequence of processing steps.

The method is characterized by the following scheme:

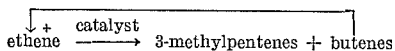

Particularly the invention pertains to the simultaneous conversion of ethene to ethene-trimer and the reaction of ethene with ethene-dimer, a normal butene, with the formation of a reaction product predominantly containing hexenes and normal butenes, the hexenes being mainly 3-methylpentenes. The 3-methylpentenes are recovered as reaction product with at least a part of the normal butenes being recycled to the reaction step.

As used herein the term "3-methylpentenes" comprises monoolefines having a 3-methylpentane carbon skeleton, i.e. 3-methylpentene-1, 3-methylpentene-2 cis and trans, and 2-ethylbutene-1.

Other objects will be apparent from the following description of the invention.

In accordance with the present invention a simultaneous conversion of ethene to ethene-trimer and a conversion of ethene and ethene-dimer takes place at conditions effective to selectively form a reaction mixture predominating in ethene-dimer and hexenes, the hexenes mainly being 3-methylpentenes.

Essential to successful practice of the invention is, together with the conversion of ethene to ethene-trimer, mainly bound to the selective reaction of ethene and ethene-dimer, i.e. normal butenes, with the production of a reaction product predominating, from 70 to 99%, in hexenes and butenes, the hexenes mainly, from 60–98%, being 3-methylpentenes. The reaction mixture is separated by fractional distillation, the ethene-dimer is at least in part recycled, and a 3-methylpentene product fraction is recovered.

In addition to 3-methylpentene-2 the isomers 3-methylpentene-1 and 2-ethylbutene-1 will also be present in the 3-methylpentenes. Table 1 shows the thermodynamic equilibrium conditions in the 3-methylpentene group at different actual temperatures.

TABLE 1

Percent equilibruim distribution (ideal gas) in the 3-methylpentene group. Temp. in ° K.

| Component | 298.16 | 300 | 400 | 500 |
|---|---|---|---|---|
| 3-methylpentene-2 cis and trans | 96.92 | 96.90 | 94.06 | 90.55 |
| 3-methylpentene-1 | 0.15 | 0.15 | 0.60 | 1.62 |
| 2-ethylbutene-1 | 2.93 | 2.95 | 5.33 | 7.83 |

By proper choice of a catalyst system which simultaneously is serving as catalyst for the above mentioned reactions and acting as a double-bond isomerization catalyst, the process will result in a selective production of 3-methylpentene-2 from ethene.

The 3-methylpentenes, and most notable 3-methylpentene-2 are materials of great commercial importance for example as raw materials in the gasoline production or as intermediates in the production of other chemicals. Thus, 3-methylpentene-2 can be demethanized at higher temperatures to give a high yield of isoprene, which is an important compound in the synthetic rubber industry.

The process according to the invention can be carried out either batchwise or continuously. One or a number of reaction zones in series can be employed. The reaction mixture is conveniently separated into its component fractions by fractional distillation procedures.

Temperatures at which the 3-methylpentene-forming reaction is carried out, broadly range from about −50° C. to 150° C., with temperatures of −30° C. to 100° C. being generally preferred, and temperatures of 0 to 90° C. being most advantageous.

The reaction pressure can vary widely, the upper limit being determined by practical considerations of equipment expense and excessive reaction rate with problems of heat removal.

Generally repressures up to 200 atm. are practical, with pressure of 0.1 to 70 atm. being preferred and pressures of 0.1 to 35 atm. being most desirable.

The ratios of ethene to ethene-dimer in the reaction zone may vary. Generally it is preferred to operate with an excess of the ethene-dimer. In those cases where all ethene-dimer is recycled to the reaction zone a concentration of $C_4$-olefines will be obtained which is given by the fact that the formation of $C_4$-olefines takes place at the same rate as the further conversion of $C_4$-olefines to higher products.

It is generally advantageous to employ a solvent in the reaction. Suitable solvents include hydrocarbons such as paraffines and aromatics as well as halogenated derivatives, and the like. Particularly suitable solvents are benzene, toluene, chlorobenzene, dichloroethane, and the like. The use of polar solvents will in general tend to increase the rate of reaction as compared with a less polar medium. Thus, the use of chlorobenzene as solvent will give a higher rate of reaction as compared with the same system where benzene is used as solvent. Furthermore a polar reaction medium will in general favor the formation of the desired branched products. The ease of separation from the reaction products by means of fractional distillation should also be taken into consideration when a solvent is selected.

For the reaction suitable catalysts effective in the selective production of 3-methylpentenes are employed.

When carrying out the process of the invention for the selective production of the 3-methylpentenes, use is made of a catalyst system comprising the combination of compounds of metals from the 8th Group of the periodic table with Lewis acids, preferably as compounds of the metals from the 2nd or 3rd Group of the periodic table.

The preferred metals from the 8th Group of the periodic table are nickel or cobalt. The best results are obtained by using nickel compounds. The Group 8 metal compounds effective for use in the selective production of 3-methylpentenes are characterized by an electron configuration in which the outer electron shell is not filled, i.e. the metal atoms have an outer electron shell deficiency of 2 or 3 electrons as compared with the nearest noble gas.

Preferably the Group 8 metal compounds are soluble in the system at least to the extent of 0.001 millimole per liter of the reaction mixture. An important property of the Group 8 metal compounds which act as effective catalyst components in the production of 3-methylpentenes, is that they must be sufficiently stable against reduction to metallic form under the given reaction conditions, so that they are not reduced to the corresponding metal to such an extent that they no longer act as catalyst.

Typical nickel compounds meeting the above requirements and being effective catalyst components in the selective production of 3-methylpentenes are illustrated by the following 5 types of compounds, it being understood that the corresponding compounds of other Group 8 metals may also be employed:

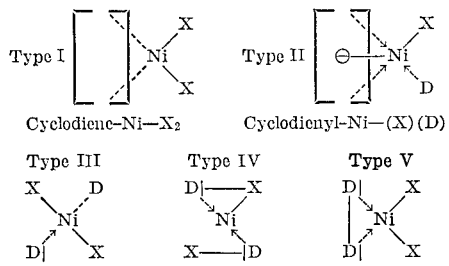

In the types I to V above D| represents a donor equivalent having one free electron pair as for example in the groups |O<, |S<,

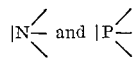

|D—D| is a bifunctional donor ligand, X is an equivalent of an organic or inorganic acid or a hydrocarbon group of the type alkyl or aryl containing from 1 to 10 carbon atoms, X—D| is a chelate ligan containing both a donor- and an acid-equivalent, and cyclodiene and cyclodienyl is a cyclic hydrocarbon with at least two double bonds, and a radical thereof respectively, containing 3–12 carbon atoms.

Illustrative of the Type I compounds are:

tetramethylcyclobutadiene-nickel-dichloride and
tetraphenylcyclobutadiene-nickel-dibromide.

Illustrative of the Type II compounds are:

cyclopentadienyl-tri-phenyl-phosphine-nickel-monochloride and
cyclopentadienyl-tri-n-butylphosphine-nickel-monoethyl.

Illustrative of the Type III compounds are:

(triphenylphosphine)$_2$-nickel-nitrate,
(tri-n-butylphosphine)$_2$-nickelsulphate,
(tricyclohexylphosphine)$_2$-nickel-rhodanide,
(tri-di-n-butylamino-phosphine)$_2$-nickel-chloride,
(tri-iso-propyl-phosphine)$_2$-nickel-iodide,
(tricyclohexylphosphine)$_2$-nickel-chloracetate,
(2,4,6-trimethylpyridine)$_2$-nickel-chloride,
(piperidine)$_2$-nickel-chloride,
(tricyclohexylphosphine)$_2$-nickelethylate, and
(triisopropylphosphine)$_2$-nickel-naphtolate.

Illustrative of the Type IV compounds are:

nickel-dimethylglyoxime,
nickel-acetylacetonate,
nickel-benzoyl-acetonate,
nickel-(8-hydroxychinolite), and
nickel-phthalocyanine.

Illustrative of the Type V compounds are:

ethylenediamine-nickel-chloride,
1,2-bis-diethylphosphino-ethane)-nickel-bromide, and
2,2'-dipyridyl-nickel-diethyl.

The catalytically active nickel compounds of the types III and V can readily be formed by reaction of a nickel salt of an organic or inorganic acid with a Lewis base.

Thus, nickel compounds such as $NiCl_2$, $NiBr_2$, $Ni(NO_3)_2$, $NiSO_4$, $Ni(OOCCH_3)_2$, $Ni(OC_2H_5)_2$ and the like may be prereacted with a Lewis base to form a compound of the above mentioned type, or reacted in situ with a corresponding Lewis base in the reaction mixture to form the active catalyst components.

Illustrative Lewis bases for these reactions are compounds containing tri-valent nitrogen, phosphorus, arsenic or antimony, or di-valent oxygen or sulfur. The best results with regard to a selective production of 3-methylpentenes are obtained by use of Lewis bases containing phosphorus and nitrogen such as tri-n-butylphosphine, tri-n-octylphosphine, tri-isopropyl - phosphine, tri - cyclohexylphosphine, tri-di-n-butylaminophosphine, 1,2-bis-diethylphosphino-ethane, di-tert.-butylamine, 2,4,6-trimethylpyridine (sym. collidine), 2,2-dipyridyl, o-phenanthroline and ethylenediamine.

Illustrative of the reaction between nickel compounds and Lewis bases are the following 5 examples:

(1)   $NiCl_2 + 2\ P(C_6H_{11})_3 \rightarrow NiCl_2[P(C_6H_{11})_3]_2$
(2)   $NiSO_4 + 2\ P(n-C_4H_9)_3 \rightarrow NiSO_4[P(n-C_4H_9)_3]_2$
(3)   $Ni(SCN)_2 + 2\ P(N(n-C_4H_9)_2)_3 \rightarrow$
                $Ni(SCN)_2[P(N(n-C_4H_9)_2)_3]_2$
(4)   $NiBr_2 + 2$ (sym. collidine) $\rightarrow NiBr_2$(sym. collidine)$_2$
(5)   $NiI_2 + 2,2'$-dipyridyl $\rightarrow NiI_2(2,2'$-dipyridyl)

The Lewis acid component is preferably a compound of the metals from the 2nd and 3rd Group of the periodic table, as illustrated by the following formulae:

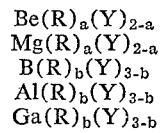
and
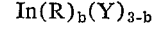

where R is hydrogen or a hydrocarbon group such as an alkyl- or aryl-group containing from 1 to 50 carbon atoms, Y is halogen or a monovalent radical of the type —OR, —SR, —NR$_2$ and the like, $a$ is 1–2 and $b$ is 0–2.

Even though the above mentioned Lewis acids are limited to compounds of the Group 2 or 3 metals of the periodic table, it should be appreciated that all Lewis acids which in combination with the earlier mentioned transition-metal compounds will given an equivalent catalytic effect, are comprised by the invention.

The Lewis acid compounds must be soluble in the reaction system at least to such as extent that the system is catalytically active. Further under the given reaction conditions the Lewis acid compound must not reduce the transition metal compound to the metallic form to such an extent that it no longer acts as an active catalyst component.

Instead of prereacting the Lewis bases with the transition metal compounds as indicated above, the Lewis base may similarly be prereacted with the Lewis acid compounds before being added to the reaction system. This may be illustrated as follows:

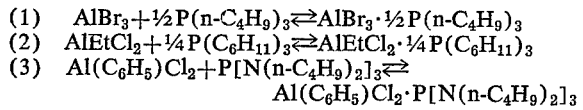

From the above it appears that the active catalyst system also may be formed by passing all the catalyst components separately into the reaction zone.

The preparations of the catalyst components may be varied within wide limits. It is preferred to use such amounts of the transition metal compounds that the ratio of transition metal to Lewis acid metal is in the range of 0.01 to 1.5, and the amount of Lewis base is preferably chosen such that the ratio of the donor equivalents in the reaction mixture to the sum of transition metal plus Lewis acid-metal does not exceed 8/5. The term "donor equivalent" as used herein means a Lewis-base-group having one free electron pair. For example, triphenylphosphine has 1 donor equivalent per molecule, whereas 2,2'-dipyridyl or ethylene diamine has 2 donor equivalents per molecule.

The concentration of the transition metal compounds may be chosen in the range from $10^{-6}$ to $10^{-1}$ moles per liter of reaction mixture, $10^{-5}$ to $10^{-2}$ moles per liter being preferred, and $10^{-4}$ to $10^{-2}$ being most desirable.

For the selective production of 3-methylpentenes it is of importance to use strong Lewis bases in the catalyst systems, because they generally will favor the production of branched hexenes, and besides they will contribute to decrease the yield of $C_8$- and higher olefines. Thus, the presence of for example tricyclohexylphosphine, triisopropylphosphine, tri-n-butylphosphine or tri-di-n-butylaminophosphine will increase the yield of 3-methylpentenes in the hexene fraction as compared with the yield obtained with triphenylphosphine, the reaction conditions otherwise being the same.

Further, it is of importance in the selective production of 3-methylpentenes that the catalyst system may function as a double-bond isomerization catalyst for the butenes as well as for the hexenes.

It should be appreciated that the invention comprises the addition of all compounds to the catalyst system with the direct purpose of increasing the selectivity by increasing the isomerization activity in the production of 3-methylpentenes, especially 3-methylpentene-2.

A batch process may be carried out for example by passing the monomer mixture of ethene and ethene-dimer for some time, e.g. 1/4–5 hours, into the catalyst mixture, if desired under pressure, with subsequent isolation of the reaction products from the catalyst mixture as indicated above, whereby the catalyst mixture, or at least a part thereof may be reused.

The accompanying drawing (flowsheet) illustrates how the process of the invention may be carried out as a continuous process. The catalytic components and the solvent are premixed in zone 4. The nickel component is added from zone 1 and the aluminium component plus the Lewis base are added from zone 2. Solvent is introduced from zone 9.

The catalyst solution in introduced continuously into reaction zone 5 from the mixing zone 4 via line 15, in an amount sufficient to compensate for the amount of catalyst consumed. A recycle stream of solvent, catalyst and some higher olefines is passed from separation zone 6 via line 16 to reaction zone 5. Fresh ethene feed is passed from zone 3 via line 17 to the reaction zone 5 while unreacted ethene and ethene-dimer is passed from separation zone 7 via lines 18 and 17 to reaction zone 5.

In zone 5, the ethene and ethene-dimer undergo catalytic reaction to form a reaction mixture consisting essentially, from 70 to 99%, of normal butenes and hexenes, the hexenes being essentially, from 60 to 98%, 3-methylpentenes, primarily in the form of 3-methylpentene-2. The average residence time in zone 5 is adjusted to give the above composition of the product, and the reaction mixture is continuously withdrawn via line 19 and passed to separation zone 6.

In zone 6 the hexenes and the low temperature boiling components are separated from the reaction mixture. The distillation conditions in the upper part of the distillation column are suitably chosen in the temperature range of 20° C. to 100° C. at pressures from 0.15 atm. to 2.0 atm.

The overhead fraction is passed via line 20 to separation zone 7 wherein the hexene fraction is separated from the lower boiling components and passed via line 21 to zone 8 for storage. The overhead fraction from separation zone 7 consisting of $C_2$ and $C_4$ olefines is passed via lines 18 and 17 back to reaction zone 5.

The distillation conditions in the upper part of column 7 are suitably chosen in the temperature range from −20° C. to 90° C. at pressures from 0.15 atm. to 5.0 atm.

The bottom fraction from distillation zone 6 is returned via line 16 to zone 5. A small part of this fraction is withdrawn and passed via line 22 to distillation zone 9, wherein the solvent is distilled off and passed via line 23 to zone 4 for reuse. In the example illustrated on the flowsheet is used a solvent having a boiling point lower than the lowest boiling $C_8$ in the reaction mixture. An intermediate distillate fraction consisting essentially of $C_8$ olefines may then be recovered from zone 9 via line 24 to storage zone 11. By selection of a solvent having a boiling point higher than the $C_8$-fraction the solvent may suitably be recovered as an intermediate fraction and passed to zone 4 as mentioned above.

Used catalyst together with higher olefines are passed via line 25 to zone 10. This catalyst may be recovered for regeneration and reuse, or it may be discarded.

However, the consumption of catalyst in the process is very low; thus by use of pure raw materials a conversion of ethene in the range of $10^4$ kilograms per kilogram nickel compound may be obtained.

The following examples illustrate the invention:

EXAMPLE 1

A catalyst consisting of 0.635 g. $Al(C_2H_5)Cl_2$ and 0.48 g. $NiCl_2[P(N(n-but)_2)_3]_2$ was dissolved in 500 ml. chlorobenzene and introduced into a 2 liter stainless steel autoclave in a nitrogen atmosphere. The autoclave was equipped with a magnetic stirrer and outer and inner cooling to provide a good temperature control. By using a circulation thermostate the catalyst mixture was thermostated at 20±0.5° C. and the autoclave was filled with ethene to a pressure of 1 atm. The conversion started immediately after the ethene was contacted with the catalyst solution, and after a reaction time of 2 minutes the comsumption of ethene was more than 10 liters of ethene gas per minute. After 30 minutes the reaction was stopped. At that time the ethene consumption was 2.5 liters per minute. Reaction product formed, 280 ml. The reaction mixture was then transferred to a distillation apparatus and fractionated at 1 atm. pressure, and the fractions were analyzed by gas chromatography.

Fraction 1 (C₄-olefines)

Up to +10° C.: 159 ml. of the reaction product of which:

| | Percent |
|---|---|
| Butene-1 | 2 |
| Butene-2 trans | 70.5 |
| Butene-2 cis | 27.5 |

Fraction 2 (C₆-olefines)

From 10 to 75° C.: 115 ml. of the reaction product of which:

| | Percent |
|---|---|
| 3-methylpentene-1 | 0.7 |
| 2-ethylbutene-1 | 13.3 |
| Hexene-2 trans | 7.7 |
| 3-methylpentene-2 trans | 24.5 |
| Hexene-2 cis | 3.3 |
| 3-methylpentene-2 cis | 50.5 |

Fraction 3

Above 75° C.: The solvent plus 6 ml. of the reaction product containing $C_8$- and higher olefines.

EXAMPLE 2

1.27 g. $Al(C_2H_5)Cl_2$ and 0.175 g. tri-cyclohexylphosphine were dissolved in 100 ml. chlorobenzene and heated at 50° C. for one hour in nitrogen atmosphere. This solution together with 0.390 g. (tri-cyclohexylphosphine)₂-NiBr₂ and 400 ml. chlorobenzene was introduced into a 2 liter stainless steel autoclave which in advance had been evacuated to a pressure lower than $10^{-2}$ mm. Hg for one hour. The reaction mixture was thermostated at 40±0.5° C. and the autoclave was filled with a monomer mixture of ethene and butene-2 in a ratio 1/1 (gas volume) to a pressure of 5 atm., this pressure being kept constant during the whole reaction period. After 30 minutes the reaction was stopped and the reaction products were separated from the reaction mixture by means of fractional distillation, the fractions being analyzed as mentioned in Example 1. $C_6$-olefines formed: 450 ml., of which 90.5% 3-methylpentenes and 9.5% n-hexenes.

EXAMPLE 3

0.119 g. tetra-methylcyclobutadiene-nickel-dichloride and 0.7 g. tri-cyclohexylphosphine were dissolved in 300 ml. chlorobenzene and introduced into a 2 liter glass reactor together with a solution of 0.635 g. $Al(C_2H_5)Cl_2$ in 200 ml. chlorobenzene under nitrogen atmosphere. The reactor was equipped with a magnetic stirrer and was thermostated at 20±0.5° C. The nitrogen atmosphere was displaced by ethene and the reaction started. The ethene pressure in the reactor was maintained at 1 atm. by regulating the ethene feed to the reactor. After 30 minutes the reaction was stopped and the reaction products were separated from the reaction mixture by means of fractional distillation, the fractions being analyzed as mentioned in Example 1.

Reaction product formed: 250 ml.
Product composition: 50% butenes of which 2.5% butene-1 and 97.5% butene-2 cis and trans
40% hexenes of which 87.0% 3-methylpentenes and 13.0% n-hexenes
10% $C_8$- and higher olefines.

EXAMPLE 4

Procedure as in Example 1, using a catalyst consisting of

| | G. |
|---|---|
| $NiCl_2[P(n-but)_3]_2$ | 0.065 |
| $Al(C_2H_5)Cl_2$ | 0.318 |

Solvent: Chlorobenzene 500 ml.
Monomer: Ethene.
Pressure: 1 atm.
Temperature: 20° C.

At reaction times 15 and 30 minutes samples were collected from the reaction mixture and analyzed. The product composition:

Reaction time 15 minutes:
  49.3% butenes
  47.0% hexenes, of which 92.5% 3-methylpentenes
  3.7% $C_8$- and higher olefines.
Reaction time 30 min.:
  42.6% butenes
  52.8% hexenes, of which 93.0% 3-methylpentenes
  4.6% $C_8$- and higher olefines.

After 60 minutes the reaction was stopped. Reaction product formed: 420 ml.
Product composition:
  36.2% butenes
  58.3% hexenes, of which 43.2% 3-methylpentenes
  5.5% $C_8$- and higher olefines.

EXAMPLE 5

Procedure as in Example 1, using a catalyst consisting of

| | G. |
|---|---|
| $NiCl_2[P(n-but)_3]_2$ | 1.30 |
| $Al(C_2H_5)Cl_2$ | 0.318 |

Solvent: Chlorobenzene, 500 ml.
Monomer: Ethene
Reaction time: 60 min.
Pressure: 1 atm.
Temperature: 20° C.
Reaction product formed: 400 ml.
Product composition:
  60.0% butenes
  37.0% hexenes, of which 87.0% 3-methylpentenes
  3.0% $C_8$- and higher olefines.

EXAMPLE 6

Procedure as in Example 1, using catalyst consisting of

| | G. |
|---|---|
| $(C_5H_5)NiCl-P(n-but)_3$ | 0.106 |
| $Al(C_2H_5)Cl_2$ | 0.318 |

Solvent: Methylenechloride, 500 ml.
Monomer: Ethene
Reaction time: 60 min.
Pressure: 1 atm.
Temperature: 20° C.
Reaction product formed: 200 ml.
Product composition:
  70.0% butenes
  25.0% hexenes, of which 75.0% 3-methylpentenes
  5.0% $C_8$- and higher olefines.

EXAMPLE 7

Procedure as in Example 1, using a catalyst consisting of

| | G. |
|---|---|
| Ni-(8-hydroxychinoline)₂ | 0.087 |
| $Al_2(C_2H_5)_3Cl_3$ | 0.620 |
| P(iso-propyl)₃ | 0.200 |

Solvent: 1,2-dichloroethane, 500 ml.
Monomer: Ethene.
Reaction time: 30 min.
Pressure: 20 atm.
Temperature: 0° C.
Reaction product formed: 250 ml.
Product composition:
  74.1% butenes
  23.6% hexenes, of which 76.0% 3-methylpentenes
  2.3% $C_8$- and higher olefines.

EXAMPLE 8

Procedure as in Example 2, using a catalyst consisting of

|  | G. |
|---|---|
| $NiCl_2[P(iso\text{-}propyl)_3]_2$ | 0.145 |
| $Al(C_2H_5)Cl_2$ | 0.635 |
| $P(iso\text{-}propyl)_3$ | 0.200 |

Solvent: Chlorobenzene, 500 ml.
Monomer: Ethene/butene=1/1 (gas volume)
Reaction time: 30 min.
Pressure: 1 atm.
Temperature: 10° C.
Hexenes formed: 120 ml., of which 91.0% 3-methylpentenes $C_8$- and higher olefines formed: 20 ml.

EXAMPLE 9

Procedure as in Example 3, using a catalyst consisting of

|  | G. |
|---|---|
| $Ni(Cl\text{-}acetate)_2 \cdot [P(C_6H_{11})_3]_2$ | 0.101 |
| $Al(C_2H_5)Cl_2$ | 0.635 |
| $P(C_6H_{11})_3$, tricyclohexylphosphine | 0.700 |

Solvent: Chlorobenzene, 500 ml.
Monomer: Ethene
Reaction time: 30 min.
Pressure: 1 atm.
Temperature: 10° C.
Reaction product formed: 320 ml.
Product composition:
    69.7% butenes
    24.0% hexenes, of which 88.6% 3-methylpentenes
    6.3% $C_8$- and higher olefines.

EXAMPLE 10

A catalyst consisting of 0.404 g. $[(n\text{-}but)_3P]_2 Ni(CCl_3CO_2)_2$ and 0.318 g. $AlEtCl_2$ was dissolved in 500 ml. chlorobenzene and passed into a 2 liter acid resistant autoclave in argon atmosphere. The autoclave was equipped with magnetic stirrer, and during the experiment the temperature in the reaction mixture was maintained constant at 40±0.5° C. by using water circulation thermostat, heat exchange taking place through the walls of the autoclave as well as through the surface of a coil in the solution. Under good stirring the autoclave was filled with ethene through a gas inlet tube having its opening below the surface of the solution, to a pressure of 1 atm., and ethene was introduced into the autoclave at a rate of 3 Nl/min. for the rest of the experiment. The reaction started immediately after the monomer was contacted with the catalyst solution. Soon after the reaction had started a discharge valve on the autoclave was opened, and liquid from the autoclave was continuously passed into the distillation flask of a glass distillation apparatus filled with argon at a rate of 5 ml. per min. The apparatus was protected against the atmosphere with a mercury pressure relief valve. By continuous distillation the fraction boiling up to +10° C., primarily normal butenes, was separated from the other compounds, condensed and passed into a cooled (−10° C.) storage vessel. This was equipped with a metal discharge tube in the bottom and connected to the upper part of a 30 ml. steel bomb mounted above the autoclave, having the same temperature as the storage vessel. Further a pressure equalizing tube was mounted between the storage vessel and the bomb. From the bottom of the bomb a tube was connected to the autoclave. The connecting tubes, the one between the autoclave and the bomb as well as the ones between the bomb and the storage vessel, could be closed by needle valves. Every 10th minute the content of the storage vessel was passed into the steel bomb, and the valves were closed. Ethene from a separate source was pressed into the bomb to a pressure of 7 atm., and after the ethene feed was cut off the content of the bomb was pressed into the autoclave. After a reaction time of 60 minutes the experiment was stopped, and the content of the autoclave and the distillation apparatus was combined and fractionated by distillation. The fractions were gas chromatographically analyzed.

Reaction product formed: 225 g.
Product composition:
    41.3% butenes
    49.6% hexenes, of which 89.1% 3-methyl-pentenes
    9.1% $C_8$- and higher olefines.

EXAMPLE 11

Procedure as in Example 1, using a catalyst consisting of

|  | G. |
|---|---|
| $(n\text{-}but_3P)_2Ni(CH_2ClCO_2)_2$ | 0.081 |
| $[(C_6H_{11})_3P]_2Ni(CH_2ClCO_2)_2$ | 0.101 |

0.560 g. $(n\text{-}but_3P) + 1.27$ g. $Al(C_2H_5) Cl_2$ (dissolved in 50 ml. chlorobenzene).

Solvent: n-heptane, 500 ml.
Monomer: Ethene
Reaction time: 30 min.
Pressure: 1 atm.
Temperature: 40° C.
Reaction product formed: 160 ml.
Product composition:
    65.9% butenes
    32.1% hexenes, of which 83.2% 3-methyl-pentenes
    2.0% $C_8$- and higher olefines.

EXAMPLE 12

A 1 liter acid resistant autoclave, equipped with stirrer and temperature control means as described in Example 10, contained 0.086 g. $[n\text{-}but_3P]_2Ni(CH_2ClCO_2)_2$. The autoclave was evacuated to $1 \cdot 10^{-2}$ mm. Hg for 1 hour at room temperature. 160 g. butene, formed in the experiments described in the above examples, was sucked into the autoclave from a 1 liter bomb. The temperature in the liquid was adjusted to 40±0.5° C. where it was maintained during the entire experiment. The pressure in the autoclave was then 3.3 atmospheres. Ethene, 2.5 g. was pressed into the autoclave to 1 atm., so that the pressure in the autoclave was 4.3 atm. at the beginning. A 30 ml. acid resistant steel bomb containing 0.537 g. $n\text{-}but_3P + 0.676$ g. $Al(C_2H_5)Cl_2$ dissolved in 13.3 ml. chlorobenzene, and having ethene pressed in to a pressure of 6 atm., was mounted on an inlet tube to the autoclave on beforehand. At zero time the content of the steel bomb was pressed into the autoclave while at the same time ethene was passed into the reaction mixture at a rate of 1 Nl per minute. The rate of introduction was maintained constant during the entire experiment. After a reaction time of 120 minutes the experiment was stopped. The pressure in the autoclave had then fallen to 2 atm. The content of the autoclave was fractionated by distillation, and the fractions were gas chromatographically analyzed.

Reaction product formed: 313 g. of which:

|  | G. |
|---|---|
| Butenes | 160.8 |
| Hexenes | 139.6 |
| $C_8$- and higher olefines | 12.6 |

Composition of $C_4$-fraction:

|  | Percent |
|---|---|
| Butene-1 | 2.6 |
| Butene-2 trans | 64.8 |
| Butene-2 cis | 32.6 |

Composition of $C_6$-fraction:

|  | Percent |
|---|---|
| Hexene-1 | 0.2 |
| Hexene-3 cis/trans | 3.2 |
| Hexene-2 trans | 9.7 |
| Hexene-2 cis | 3.2 |
| 3-methylpentene-1 | 1.2 |
| 2-ethylbutene-1 | 15.4 |
| 3-methylpentene-2 trans | 23.9 |
| 3-methylpentene-2 cis | 43.2 |

EXAMPLE 13

Procedure as in Example 1, using a catalyst consisting of

|   | G. |
|---|---|
| $[(C_6H_{11})_2P(CH_2)_5P(C_6H_{11})_2]NiCl_2$ | 0.074 |
| $Al(C_2H_5)Cl_2$ | 1.27 |

Solvent: n-heptane, 500 ml.
Monomer: Ethene.
Reaction time: 30 min.
Pressure: 1 atm.
Temperature: 40° C.
Reaction product formed: 80 ml.
Product composition:
    67.6% butenes
    28.4% hexenes, of which 83.2% 3-methyl-pentenes
    4.0% $C_8$- and higher olefines.

EXAMPLE 14

Procedure as in Example 1, using a catalyst consisting of

|   | G. |
|---|---|
| Co(II) acetylacetonate | 0.32 |
| $P(C_6H_{11})_3$ | 0.69 |
| $Al(C_2H_5)Cl_2$ | 1.27 |

Solvent: Benzene, 500 ml.
Monomer: Ethene
Reaction time: 60 min.
Pressure: 1 atm.
Temperature: 20° C.
Reaction product formed: 320 ml.
Product composition:
    95.0% butenes
    3.9% hexenes, of which 70.8% 3-methylpentenes
    1.1% $C_8$- and higher olefines.

EXAMPLE 15

Procedure as in Example 1, using a catalyst consisting of

|   | G. |
|---|---|
| $Ni(CH_3CO_2)_2$ | 0.221 |
| $N(C_6H_5)_3$ | 0.612 |
| $Al(C_2H_5)Cl_2$ | 1.27 |

Solvent: Chlorobenzene, 500 ml.
Monomer: Ethene
Reaction time: 30 min.
Pressure: 1 atm.
Temperature: 20° C.
Reaction product formed: 260 ml.
Product composition:
    52.5% butenes
    42.5% hexenes, of which 78.4% 3-methylpentenes
    5.0% $C_8$- and higher olefines.

EXAMPLE 16

Procedure as in Example 1, using a catalyst consisting of

|   | G. |
|---|---|
| $[n\text{-}but_3P]_2NiSO_4$ | 0.14 |
| $Al(C_2H_5)Cl_2$ | 0.222 |
| $Al(C_2H_5)_2Cl$ | 0.210 |

Solvent: Chlorobenzene, 500 ml.
Monomer: Ethene
Reaction time: 60 min.
Pressure: 1 atm.
Temperature: 20° C.
Reaction product formed: 326 ml.
Product composition:
    51.2% butenes
    45.9% hexenes, of which 87.8% 3-methylpentenes
    2.9% $C_8$- and higher olefines.

EXAMPLE 17

Procedure as in Example 1, using a catalyst consisting of

|   | G. |
|---|---|
| $Ni(CH_2ClCO_2)_2[P(C_6H_{11})_3]_2$ | 0.202 |
| Co(II) acetylacetonate | 0.26 |
| $Al(C_2H_5)Cl_2$ | 0.635 |

Solvent: n-heptane, 500 ml.
Monomer: Ethene
Reaction time: 30 min.
Pressure: 1 atm.
Temperature: 40° C.
Reaction product formed: 70 ml.
Product composition:
    62.5% butenes
    31.2% hexenes, of which 81.4% 3-methylpentenes
    6.3% $C_8$ and higher olefines.

EXAMPLE 18

Procedure as in Example 1, using a catalyst consisting of

|   | G. |
|---|---|
| Ni-acetylacetonate | 0.32 |
| Dioxane | 0.22 |
| $Al(OC_4H_9)_2Cl$ | 2.09 |

Solvent: Chlorobenzene, 500 ml.
Monomer: Ethene
Reaction time: 30 min.
Pressure: 1 atm.
Temperature: 20° C.
Reaction product formed: 94 ml.
Product composition:
    89.4% butenes
    9.4% hexenes, of which 68.9% 3-methylpentenes
    1.2% $C_8$- and higher olefines.

EXAMPLE 19

Procedure as in Example 1, using a catalyst consisting of

|   | G. |
|---|---|
| $NiBr_2[P(C_6H_{11})_3]_2$ | 1.944 |
| $P(C_6H_5)_3$ | 0.655 |
| $Be(C_2H_5)_2$ | 0.336 |

Solvent: Benzene, 500 ml.
Monomer: Ethene
Reaction time: 30 min.
Pressure: 1 atm.
Temperature: 20° C.
Reaction product formed: 122 ml.
Product composition:
    90.9% butenes
    7.4% hexenes, of which 74.9% 3-methylpentenes
    1.7% $C_8$- and higher olefiines.

EXAMPLE 20

Procedure as in Example 1, using a catalyst consisting of

|   | G. |
|---|---|
| $NiBr_2[P(C_6H_{11})_2H]_2$ | 0.077 |
| $C_6H_5\text{—}S\text{—}C_6H_5$ | 0.046 |
| $Al(C_2H_5)Cl_2$ | 1.27 |

Solvent: n-heptane, 500 ml.
Monomer: Ethene
Reaction time: 30 min.
Pressure: 1 atm.
Temperature: 40° C.
Reaction product formed: 97 ml.
Product composition:
    62.1% butenes
    32.3 hexenes, of which 73.9% 3-methylpentenes
    5.6% $C_8$- and higher olefines.

EXAMPLE 21

Procedure as in Example 1, using a catalyst consisting of

|  | G. |
|---|---|
| $NiCl_2$ | 0.064 |
| Piperidine | 0.085 |
| $Al(C_2H_5)Cl_2$ | .0635 |

Solvent: Chlorobenzene, 500 ml.
Monomer: Ethene
Reaction time: 30 min.
Pressure: 1 atm.
Temperature: 20° C.
Reaction product formed: 161 ml.
Product composition:
    72.9% butenes
    23.8% hexenes, of which 67.2% 3-methylpentenes
    3.3% $C_8$- and higher olefines.

EXAMPLE 22

Procedure as in Example 1, using a catalyst consisting of

|  | G. |
|---|---|
| $[n-but_3P]_2Ni(SC_6H_5)_2$ | 0.076 |
| $Al(C_2H_5)Cl_2$ | 1.27 |

Solvent: n-heptane, 500 ml.
Monomer: Ethene
Reaction time: 30 min.
Pressure: 1 atm.
Temperature: 40° C.
Reaction product formed: 80 ml.
Product composition:
    79.5% butenes
    18.5% hexenes, of which 79.1% 3-methylpentenes
    2.0% $C_8$- and higher olefines.

What is claimed is:
1. A process for the preparation of 3-methylpentenes from ethylene, comprising feeding ethylene into a reaction zone at a temperature of between −50 and +150° C. and at a pressure of from 0.1 to 200 atmospheres and oligomerizing it therein in the presence of a catalyst comprising:
  (a) A nickel compound selected from the group consisting of the chloride, bromide, acetate, chloroacetates, sulfate and thiophenolate of divalent nickel.
  (b) A Lewis acid selected from the group consisting of ethyl aluminum dichloride and diethyl aluminum chloride, and
  (c) A Lewis base selected from the group consisting of isopropyl, n-butyl and cyclohexyl phosphines and bis-1,5-dicyclohexylphosphino-n-pentane with the formation of a reaction product consisting primarily of normal butenes and hexenes, the hexenes comprising a major amount of 3-methylpentenes, separating hexenes and normal butenes from the reaction mixture, recovering the 3-methylpentenes as reaction product, and recycling the butenes or at least a part thereof to the reaction zone, in which they are reacted with the ethylene feed to obtain a cyclic process, ethylene being the only feed to the reaction zone except from the recycled materials.

References Cited

UNITED STATES PATENTS

| | | | |
|---|---|---|---|
| 2,881,234 | 4/1959 | Esmay et al. | 260—683.15(E) |
| 2,969,408 | 1/1961 | Nowlin et al. | 260—683.15(D) |
| 3,251,895 | 5/1966 | Wilkes | 260—683.15X |
| 3,321,546 | 5/1967 | Roest et al. | 260—683.15(D) |
| 3,028,441 | 4/1962 | Bush et al. | 260—683.15(E) |
| 3,378,706 | 4/1968 | Wilke | 260—683.15X |
| 3,355,510 | 11/1967 | Cannell et al. | 260—683.15(D) |
| 3,442,971 | 5/1969 | Onsager | 260—683.15(D) |
| 3,446,871 | 5/1969 | Maxfield | 260—683.15(D) |

PAUL M. COUGHLAN, JR., Primary Examiner

U.S. Cl. X.R.

252—429, 431